US012721766B2

(12) United States Patent
Scarlett

(10) Patent No.: US 12,721,766 B2
(45) Date of Patent: Sep. 1, 2026

(54) SEAT INCORPORATING A CUSHION

(71) Applicant: ROLAPAL LIMITED, Auckland (NZ)

(72) Inventor: Roydon Scarlett, Auckland (NZ)

(73) Assignee: ROLAPAL LIMITED, Auckland (NZ)

( * ) Notice: Subject to any disclaimer, the term of this patent is extended or adjusted under 35 U.S.C. 154(b) by 135 days.

(21) Appl. No.: 18/690,216

(22) PCT Filed: Jul. 1, 2022

(86) PCT No.: PCT/NZ2022/050085
§ 371 (c)(1),
(2) Date: Mar. 7, 2024

(87) PCT Pub. No.: WO2023/043321
PCT Pub. Date: Mar. 23, 2023

(65) Prior Publication Data

US 2025/0032332 A1 Jan. 30, 2025

(30) Foreign Application Priority Data

Sep. 20, 2021 (AU) ................................ 2021236440

(51) Int. Cl.
*A61G 5/10* (2006.01)

(52) U.S. Cl.
CPC .......... *A61G 5/1045* (2016.11); *A61G 5/1091* (2016.11)

(58) Field of Classification Search
CPC ...................................................... A47C 7/142
See application file for complete search history.

(56) References Cited

U.S. PATENT DOCUMENTS 3,552,044 A * 1/1971 Weile ...................... A42B 3/127 36/117.6
3,968,530 A * 7/1976 Dyson ................ A61G 7/05738 5/676
5,421,874 A * 6/1995 Pearce ...................... A47C 3/16 59/32
5,881,409 A * 3/1999 Pearce ................... A47C 27/12 5/655.4
6,027,777 A * 2/2000 Hirano ............... A61G 7/05738 428/36.1
10,653,573 B2 * 5/2020 Bogie ................ A61G 7/05707

FOREIGN PATENT DOCUMENTS

JP H11244342 A * 9/1999 ........... A47C 27/086
WO WO-9960896 A1 * 12/1999 ............. A47C 27/12

* cited by examiner

*Primary Examiner* — Richard Green
(74) *Attorney, Agent, or Firm* — NGUYEN TARBET IP LAW

(57) ABSTRACT

It is common for people who have postural problems to use wheelchairs. It is a problem that extended periods spent in the wheelchair can cause pressure on a particular body part. The invention discloses a seat comprising a cushion. The cushion comprises a flexible bag containing a plurality of pads and a liquid. The cushion is such that the liquid facilitates movement of the pads with respect to one another to mould the cushion in the event that a human user places body weight on the cushion.

20 Claims, 3 Drawing Sheets

SEAT INCORPORATING A CUSHION

FIELD OF INVENTION

This invention relates to a seat that incorporates a customised cushion. The seat may for example be part of a wheelchair.

BACKGROUND

It is common for people who have postural problems to use wheelchairs. It is a problem that extended periods spent in the wheelchair can cause pressure on a particular body part. This can cause pressure sores which can have serious health effects. It is known to fill wheelchair seat cushions with liquids to provide cushioning to a user. However, it can be a problem that liquids used on their own can move away from the point of pressure and so provide inadequate relief. This can occur when a user sits down or shifts position, or when the wheelchair is tilted.

OBJECT OF THE INVENTION

It is an object of preferred embodiments of the invention to go at least some way towards addressing the above problem. However, it should be appreciated that the object of the invention per se is not so limited—it is simply to provide a useful choice. Therefore, any objects or advantages of any preferred embodiment should not be read as a limitation on the scope of claims expressed more broadly.

Definitions

The terms "comprising" or "having", if and when used in relation to one or more features, in each case indicates minimum features present but does not rule out the option of there being further features that are not mentioned. The same applies to derivative words, for example "comprises", etc. The "features" may for example be physical parts and/or action steps.

SUMMARY OF THE INVENTION

According to one aspect of the invention there is provided a wheelchair seat comprising a cushion, the cushion comprising a flexible bag containing a plurality of pads and a liquid, wherein:

- the bag is air free;
- the pads are gel pieces comprised of polymer and occupy less than 60% of the volume capacity of the bag; and
- the liquid occupies at least 5% of the volume capacity of the bag;

the cushion being such that the liquid facilitates movement of the pads with respect to one another to mould the cushion in the event that a human user places body weight on the cushion.

Preferably the pads occupy less than 70%, [60%,] 50% or 40% of the volume capacity of the bag.

Preferably the liquid occupies at least 10%, 20%, 30% or 40% of the volume capacity of the bag, provided that the pads and liquid do not exceed 100% of the bag's volume capacity.

Preferably the pads comprise urethane polymer gel.

Preferably the bag comprises urethane.

Preferably the liquid provides lubrication between the pads.

Preferably the liquid comprises propylene glycol.

Preferably the pads are substantially square in transverse cross section.

Preferably the pads are substantially cylindrical in transverse cross section.

Preferably the pads are at least 5 mm in diameter or width.

Preferably the pads are about 10 mm in diameter or width.

Preferably the pads are about 20 mm or 30 mm in diameter or width.

DRAWINGS

Some preferred embodiments of the invention will now be described by way of example and with reference to the accompanying drawings, of which:

DETAILED DESCRIPTION

Figure 1:
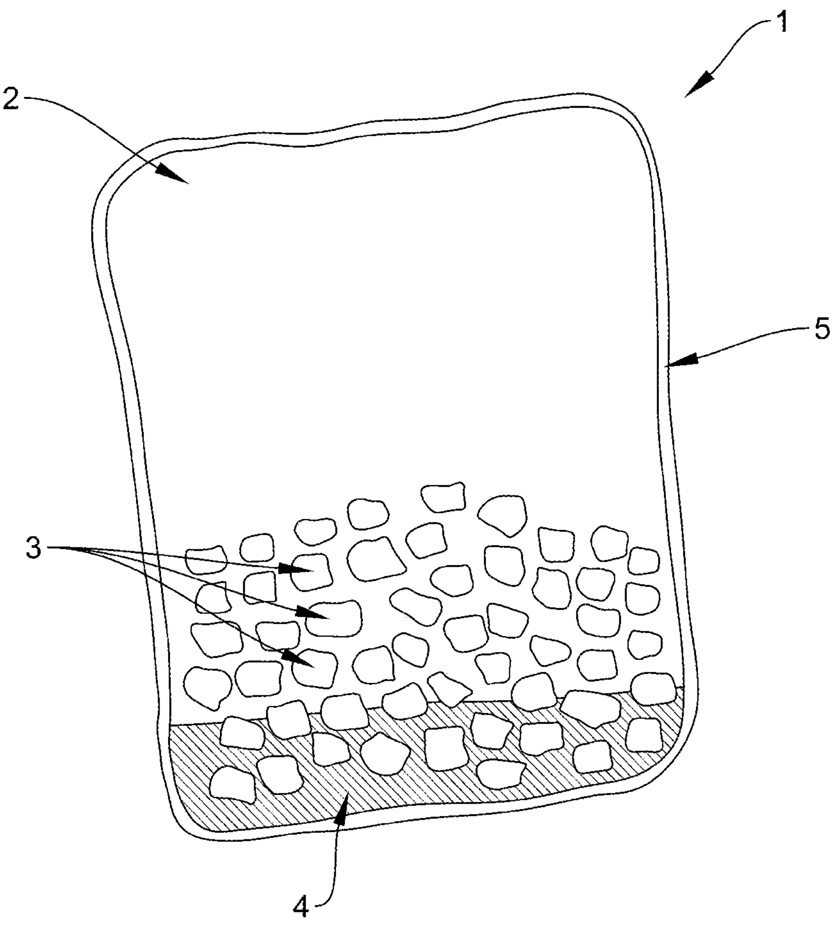
FIG. 1 is a front view of a gel pack.

Referring to FIG. 1, the gel pack 1 comprises a flexible bag 2 filled with a number of pads 3 and a liquid 4.

The bag 2 is preferably made from a urethane film which is sealed by, and reinforced with, a non-stretch nylon fabric seam 5. The urethane means the bag 2 is flexible so that it will not burst under the load of a human user, for example the user of a wheelchair, and has enough 'give' to be comfortable. The seam 5 is welded to the bag 2 which assists in preventing any fluid reduction over time. Alternatively, the bag 2 may be made of polyvinyl chloride ('PVC') or any other suitable material.

The pads 3 are preferably gel pieces comprised of polymer, for example urethane polymer gel which is a semi-solid gel that is stretchy but will not seep. The pads 3 are preferably cylindrical and are at least 5 mm in diameter. However, the pads 3 can be other shapes, for example substantially square or substantially rectangular, and in that case the width of each is preferably at least 5 mm. If the pads are at least 5 mm in diameter or width then they are less likely to move away from a region of pressure on the user when the gel pack 1 is in use. The pads may be about 10 mm, 20 mm, or 30 mm in diameter or width. The pads 3 may be in the form of beads, pellets or cubes, and may be substantially cylindrical or square in transverse cross section.

In the preferred embodiment, the gel pads 3 are formed by taking sheets of urethane polymer gel and cutting the sheets into pieces adapted to be placed in the bag 2.

The liquid 5 is preferably propylene glycol which is a slippery lubricant, enabling the pads 3 to move freely in the bag 2 and with respect to one another. This is preferable over other liquids such as water, which may not allow the pads 3 to move as freely, and oils, which may compromise the integrity of the pads 3. Propylene glycol is also preferable because it is fire retardant and if the bag 2 were to burst it is not harmful to the user.

To form the gel pack 1, the desired amounts of pads 3 and liquid 4 are placed in the bag 2, the air in the bag 2 is removed and the bag 2 is sealed by welding the fabric seam 5 around the bag's edge. It is acceptable for a small amount of air to remain, so long as the bag 2 primarily comprises the pads 2 and the liquid 5. The absence of air, or the presence of only a small amount of air, facilitates the movement of the pads 3 and reduces the risk of the bag 2 bursting. The liquid 5 provides lubrication between the pads 3.

In the preferred embodiment prior to the air being removed, the bag 2 is preferably filled with pads 3 occupying about 60% of the volume capacity of the bag 2 and is preferably filled with liquid 5 occupying about 10% of the volume capacity of the bag 2. The remainder of the volume capacity of the bag 2 comprises air.

In alternative embodiments when the bag 2 is air free, or substantially air free, the pads 3 occupy less than 80%, 70%, 60%, 50% or 40% of the volume capacity of the bag 2, provided that the pads 3 and liquid 5 do not exceed 100% of the bag's volume capacity.

In alternative embodiments when the bag 2 is air free, or substantially air free, the liquid 5 occupies at least 5%, 10%, 20%, 30% or 40% of the volume capacity of the bag 2, provided that the pads 3 and liquid 5 do not exceed 100% of the bag's volume capacity.

Figure 2:
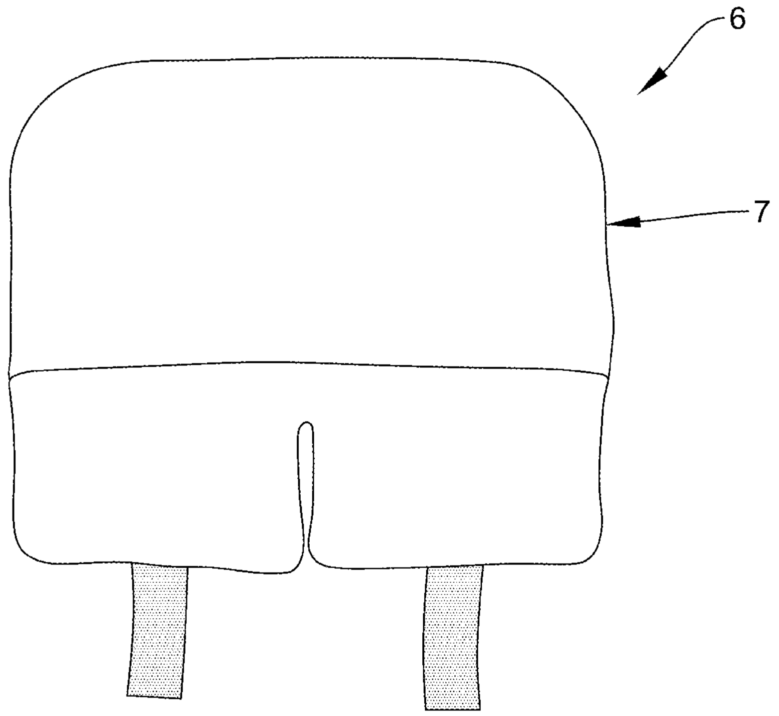
FIG. 2 is a top view of a cushion.
Figure 3:
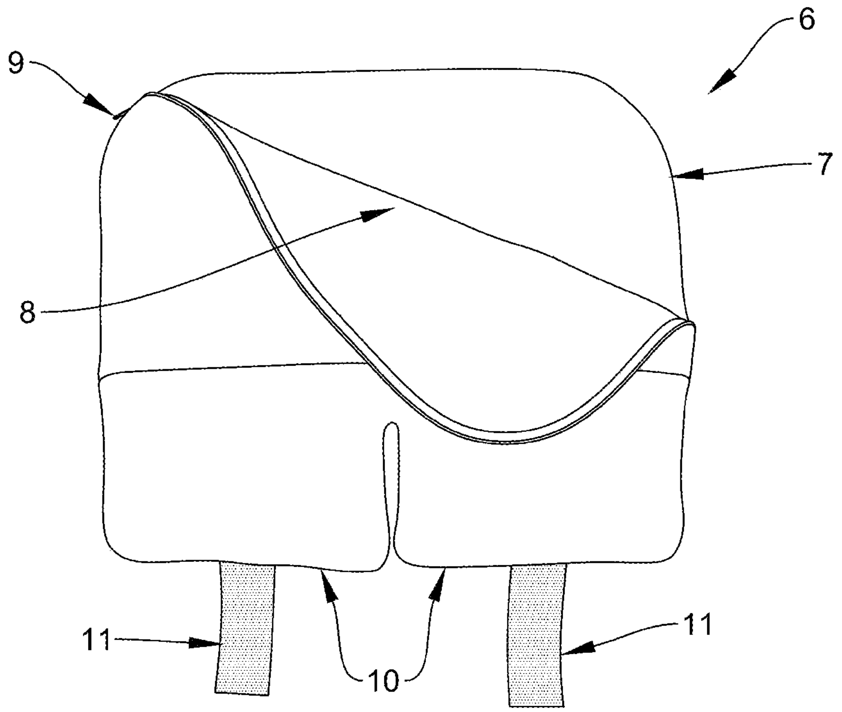
FIG. 3 is a top view of a cushion cover.

Referring to FIGS. 2 and 3, the cushion 6 comprises the cushion cover 7. The cover 7 comprises a pocket 8 which can be opened and closed by way of a zipper 9. The pocket 8 comprises about ⅔ of the surface area of the cushion 6. The remaining ⅓ of the surface area comprises a pair of leg portions 10 filled with foam. The percentage may vary, for example the pocket-to-leg portion ratio may be ¾ to ¼, or may be ½ to ½. A strap 11 is attached to each of the leg portions 8 for securing them to a chair (not shown), for example the wheelchair.

In the preferred embodiment, the pocket 8 receives a gel pack 1 on each side of the cushion 6. The liquid 5 facilitates movement of the pads 3 with respect to one another to mould the cushion 6 in the event that the user places body weight on the cushion 6. The advantage of having two gel packs within the cover 7 is that the amount of displacement of cushioning caused by the user sitting on the cushion 6 is limited.

In a further embodiment, one gel pack 1 may be placed within the cover 7. However, a relatively heavy user will displace a higher proportion of the pads 3 from one side of the pack 1 to the other when sitting down on a cushion 6 with a single pad 3. This increases the pressure on the buttocks of the user when sitting down, or when weight is shifted from one side to another. The buttocks are the region of highest risk of pressure-related harm for the user, especially when the user is seated for extended periods of time. Where there are two packs 1, the displacement of the pads is limited within each pad 2, lessening any harmful impact of pressure on the buttocks caused by the user's weight shift moving too many pads 3 to one side of the cushion 6.

Alternatively, more than two pads 3 may be placed with the cushion cover 7, for example 4, 6, or 8.

Figure 4:
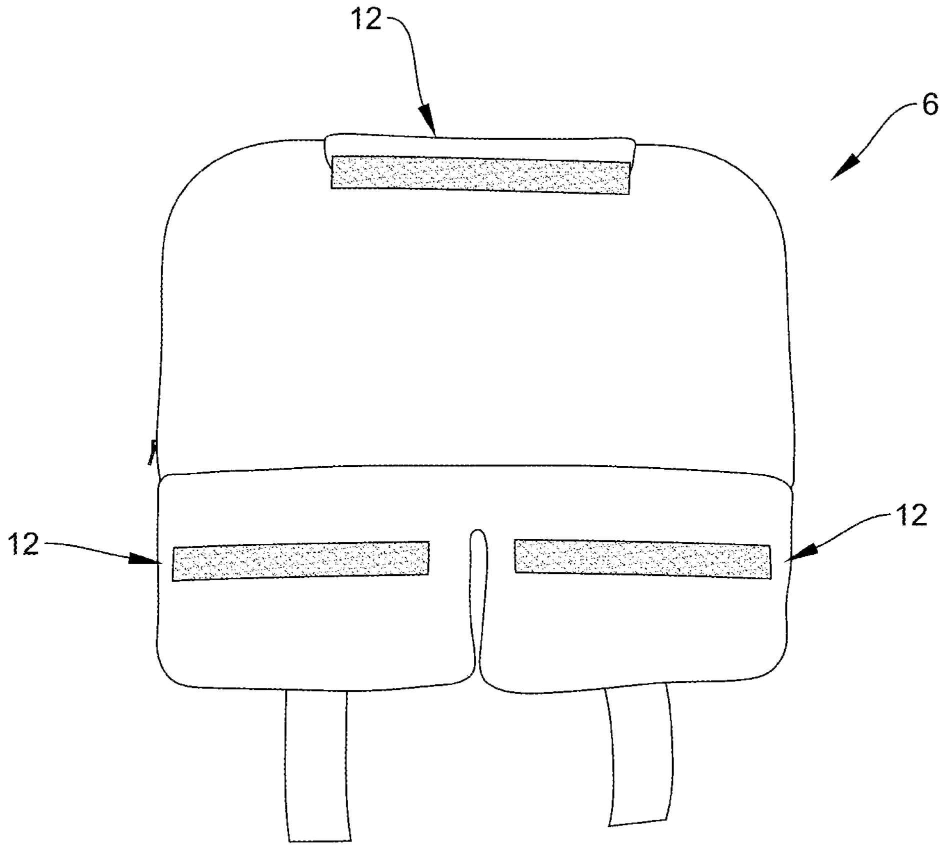
FIG. 4 is a bottom view of the cushion.

Referring to FIG. 4, the cushion 6 has means for connecting to the chair. In the preferred embodiment, the connection means comprises a series of hook or loop fastenings 12 that are adapted to connect to a corresponding series of loop or hook fastenings on the chair. The hook and loop fastenings may comprise Velcro™.

The cushion 6 of the invention is particularly suited for use as wheelchair seating. However, the gel pack 1 may be used alone or in multiples to provide armrest and backrest cushioning.

While some preferred embodiments of the invention have been described by way of example, it should be appreciated that modifications and improvements can occur without departing from the scope of the following claims.

The invention claimed is:

1. A wheelchair seat comprising a cushion, the cushion comprising a flexible bag containing a plurality of pads and a liquid, wherein:

the bag is air free;

the pads are gel pieces comprised of polymer and occupy less than 60% of the volume capacity of the bag; and the liquid occupies at least 5% of the volume capacity of the bag;

the cushion being such that the liquid facilitates movement of the pads with respect to one another to mould the cushion in the event that a human user places body weight on the cushion.

2. A wheelchair seat according to claim 1, wherein the pads occupy less than 50% or 40% of the volume capacity of the bag.

3. A wheelchair seat according to claim 1, wherein the liquid occupies at least 10%, 20%, 30% or 40% of the volume capacity of the bag, provided that the pads and liquid do not exceed 100% of the bag's volume capacity.

4. A wheelchair seat according to claim 1, wherein the pads comprise urethane polymer gel.

5. A wheelchair seat according to claim 1, wherein the bag comprises urethane.

6. A wheelchair seat according to claim 1, wherein the liquid provides lubrication between the pads.

7. A wheelchair seat according to claim 1, wherein the liquid comprises propylene glycol.

8. A wheelchair seat according to claim 1, wherein the pads are substantially square in transverse cross section.

9. A wheelchair seat according to claim 1, wherein the pads are substantially cylindrical in transverse cross section.

10. A wheelchair seat according to claim 1, wherein the pads are at least 5 mm in diameter or width.

11. A wheelchair seat according to claim 1, wherein the pads are about 10 mm, 20 mm, or 30 mm in diameter or width.

12. A wheelchair seat according to claim 1, wherein:

the pads occupy less than 60% but more than 50% of the volume capacity of the bag; and the liquid comprises propylene glycol, provides lubrication between the pads, and occupies between at least 5% and 10% of the volume capacity of the bag.

13. A wheelchair seat comprising a cushion having:

a cover comprising a pocket, a flexible bag inside the pocket, the bag being substantially air free and containing a plurality of gel pieces and liquid;

the cushion being such that:

the gel pieces occupy less than 80% of the volume capacity of the bag;

the liquid occupies at least 5% of the volume capacity of the bag; and the liquid provides lubrication between the gel pieces to facilitate movement of them with respect to one another to mould the cushion in the event that a human user places body weight on the cushion.

14. A wheelchair seat according to claim 13, wherein gel pieces occupy less than 70%, 60%, 50% or 40% of the volume capacity of the bag.

15. A wheelchair seat according to claim 13, wherein the liquid occupies at least 10%, 20%, 30% or 40% of the volume capacity of the bag, provided that the pads and liquid do not exceed 100% of the bag's volume capacity.

16. A wheelchair seat according to claim 13, wherein the liquid comprises propylene glycol.

17. A wheelchair seat according to claim 13, wherein gel pieces comprise urethane polymer.

18. A wheelchair seat according to claim 13, wherein gel pieces are substantially square or circular in cross section.

19. A wheelchair seat according to claim 13, wherein gel pieces are about 5 mm, 10 mm wide, 20 mm, or 30 mm wide.

20. A wheelchair seat according to claim 13, wherein gel pieces occupy less than 70%, 60%, 50% or 40% of the volume capacity of the bag, and the liquid occupies at least 10%, 20%, 30% or 40% of the volume capacity of the bag.

* * * * *